(12) United States Patent
Zschiedrich

(10) Patent No.: US 7,124,987 B2
(45) Date of Patent: Oct. 24, 2006

(54) HIGH VACUUM DISK

(76) Inventor: Wilfried Erich Zschiedrich, 5616 Palm Aire Dr., Sarasota, FL (US) 34243

( * ) Notice: Subject to any disclaimer, the term of this patent is extended or adjusted under 35 U.S.C. 154(b) by 19 days.

(21) Appl. No.: 10/904,527

(22) Filed: Nov. 15, 2004

(65) Prior Publication Data

US 2005/0103808 A1    May 19, 2005

Related U.S. Application Data

(60) Provisional application No. 60/481,643, filed on Nov. 14, 2003.

(51) Int. Cl.
*A45D 42/14* (2006.01)

(52) U.S. Cl. ............... 248/205.9; 248/363; 248/537

(58) Field of Classification Search .......... 248/205.9, 248/205.5, 205.7, 205.8, 206.2, 363, 537
See application file for complete search history.

(56) References Cited

U.S. PATENT DOCUMENTS

| | | | | |
|---|---|---|---|---|
| 3,568,959 A | * | 3/1971 | Blatt | 294/64.2 |
| 3,593,983 A | * | 7/1971 | Csenyi | 269/1 |
| 3,750,991 A | * | 8/1973 | Ragir | 248/205.8 |
| 3,863,568 A | * | 2/1975 | Frederick | 248/205.8 |
| 4,043,531 A | * | 8/1977 | Green | 248/537 |
| 4,393,870 A | | 7/1983 | Wagner | |
| 4,463,980 A | | 8/1984 | Orii | |
| 4,573,970 A | | 3/1986 | Wagner | |
| 4,749,219 A | * | 6/1988 | Bolle et al. | 294/64.1 |
| 4,858,976 A | * | 8/1989 | Stoll | 294/64.1 |
| 5,381,990 A | | 1/1995 | Belokin et al. | |
| 5,451,086 A | | 9/1995 | Pazzaglia | |
| 6,024,392 A | * | 2/2000 | Blatt | 294/64.1 |
| 6,039,530 A | * | 3/2000 | Schmalz et al. | 414/627 |
| 6,375,143 B1 | | 4/2002 | Burns | |
| 6,431,624 B1 | * | 8/2002 | Dunger | 294/64.1 |
| 6,478,271 B1 | * | 11/2002 | Mulholland | 248/205.8 |
| 6,588,718 B1 | | 7/2003 | Kalb | |
| 6,932,306 B1 | * | 8/2005 | Zou et al. | 248/205.5 |

* cited by examiner

Primary Examiner—Anita M. King

(57) ABSTRACT

A vacuum disk includes a hollow base having an open leading end adapted to engage a flat support surface. The hollow base and the support surface define a vacuum space when the hollow base abuts the support surface. A gasket formed of styrene block copolymers forms an airtight seal around the vacuum space. A hub formed integrally with the base defines an airflow passageway through which air in the vacuum space may flow. A valve is seated within the airflow passageway. A hollow cylinder has a leading end that sealingly engages the hub and a piston head is slideably positioned within the hollow cylinder. A vacuum is created in the vacuum space by abrupt withdrawal of the piston head from the hollow interior of the cylinder. Ambient air rushing into the hollow interior of the cylinder abruptly closes the valve before the vacuum is lost.

10 Claims, 10 Drawing Sheets

HIGH VACUUM DISK

CROSS REFERENCE TO RELATED APPLICATION

This application claims priority to U.S. Provisional Patent Application No. 60/481,643 filed by the same inventor on Nov. 14, 2003, entitled: "High Vacuum Disk."

BACKGROUND OF THE INVENTION

1. Field of the Invention

This invention relates to a vacuum disk. More particularly, it relates to a vacuum disk having a manually created high vacuum.

2. Description of the Prior Art

Suction cups are formed of a flexible and resilient material formed into a concavity. When the material is pressed firmly against a flat surface, the material flattens and most of the air in the concavity is driven out. In this way, a partial vacuum is created. However, an externally applied force in excess of about four (4) ounces is about all that is needed to defeat the vacuum and separate the suction cup from the flat surface.

Thus, a conventional suction cup can be used to hold light, unbreakable objects such as washcloths, pictures having frames formed of a high impact plastic, and the like. They gradually lose their vacuum over time and cannot be used to hold objects that might break if dropped.

An improved suction cup includes a rigid frame that surrounds a flexible and resilient conventional suction cup. A hook from which a washcloth, picture frame, or the like may be hung is pivotally mounted to the rigid frame. After the flexible and resilient part of the structure is pressed tightly against a flat surface, the hook is pivoted into its operable position. The hook includes a cam that bears against the rigid frame so that when the hook is pivoted into its operable position, a cammed surface thereof drives the rigid frame into tightly overlying relation to the flexible and resilient part of the suction cup. This enhances the vacuum within the space surrounded by the flexible and resilient part of the structure. An externally applied force of three to four pounds is needed to separate the improved suction cup from its mount.

However, it has been established that the vacuum created by the improved suction cup does not endure for more than a few hours. What is needed, then, is an improved device that has greater strength than the just-described improved suction cup and which does not lose its holding power so quickly.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for a device having qualities superior to that of a conventional suction cup, including enhanced holding power vis a vis the holding power of the known suction cups, is now met by a new, useful, and non-obvious invention.

The novel apparatus of this invention is a high vacuum disk having sustained holding power as distinguished from a low vacuum suction cup of short-lived utility. The novel vacuum disk includes a hollow base having a predetermined geometrical shape and an open leading end adapted to engage a substantially flat support surface. The hollow base includes a top wall having sidewalls that depend from a periphery of said top wall. A sealing member in the hollow interior of the hollow base is adapted to seal the hollow interior when the base is pressed firmly against the substantially flat support surface so that ambient air may not enter into the hollow interior of the base.

A vacuum space is defined within the hollow interior of the base when the sealing member is disposed in firmly abutting relation to the support surface.

A hub is formed integrally with the base and defines an airflow passageway through which air in the vacuum space may exit when the sealing member is disposed in firmly abutting relation to the support surface.

A hollow cylinder has a leading end adapted to sealingly engage the hub about an outer periphery of the hub. A piston head is slideably positioned within the hollow cylinder and a piston rod is secured to a trailing end of the piston head. The piston rod has an axis of symmetry coincident with an axis of symmetry of the hollow cylinder. A handle is secured to a trailing end of the piston rod. A sealing means is disposed about a periphery of the piston head to substantially prevent air from flowing around the piston head, i.e., to prevent air on the leading side of the piston head from flowing to the trailing side of the piston head when the piston head is positioned within the hollow cylinder.

A valve is seated within the airflow passageway. The valve allows airflow from vacuum air space to flow through the airflow passageway into the hollow cylinder on a leading side of the piston head when the piston head is displaced within the hollow cylinder in a direction away from the valve. The valve is fully seated and substantially prevents flow of ambient air into the vacuum space from the hollow cylinder after the piston head is fully withdrawn from the hollow cylinder.

A vacuum is created in the vacuum space by withdrawal of the piston head from the hollow interior of the cylinder. Ambient air rushing into the hollow interior of the cylinder abruptly closes the valve before the vacuum is lost.

An important object of the invention is to provide a vacuum disk having increased holding power vis a vis the holding power of suction cups.

Another object is to provide a vacuum disk that holds a vacuum for a sustained period of time vis a vis the time a suction cup maintains a suction.

These and other objects will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
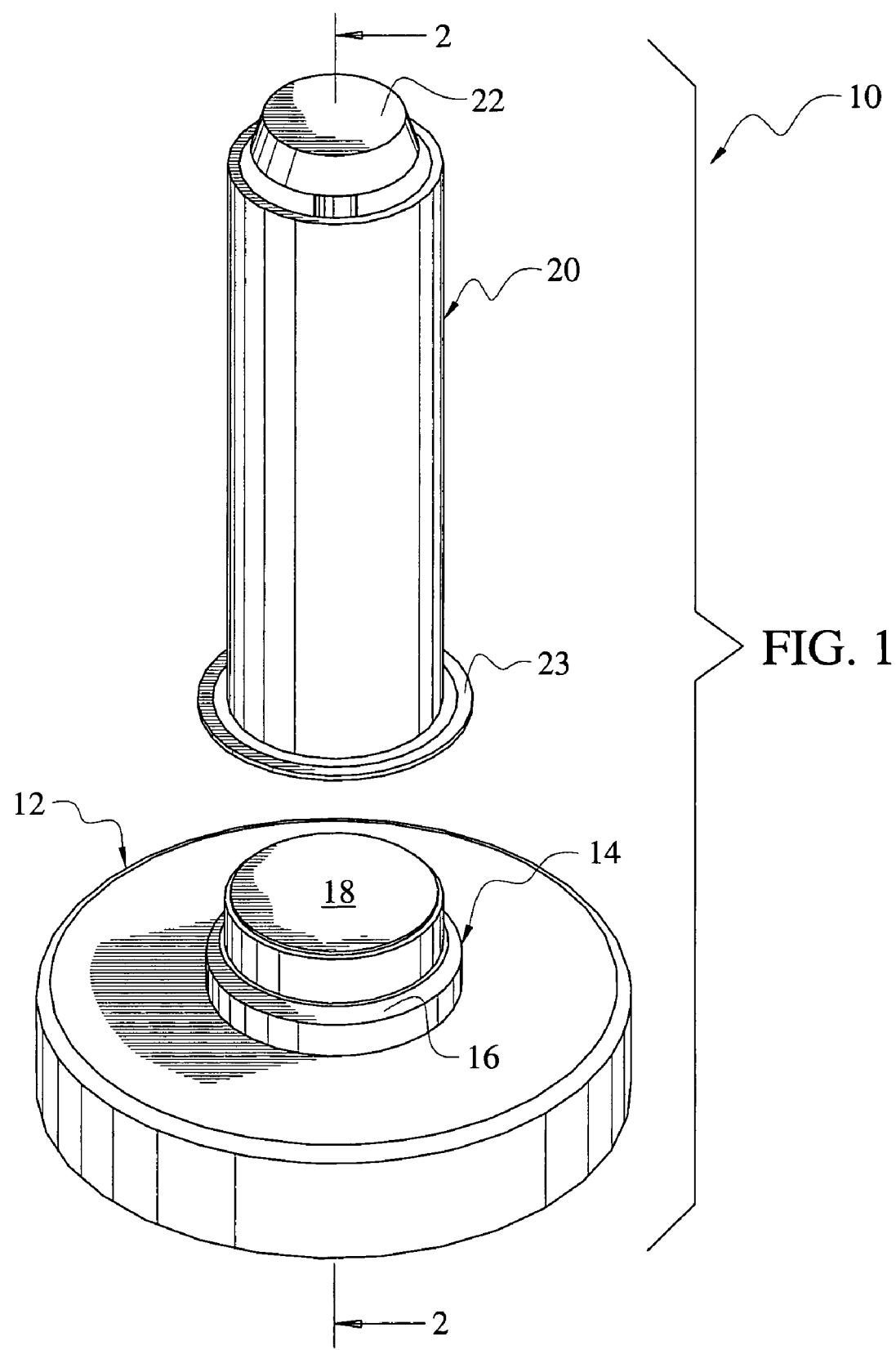
FIG. 1 is an exploded perspective view of a first embodiment of the novel vacuum disk.

Referring now to FIG. 1, it will there be seen that an illustrative embodiment of the invention is denoted as a whole by the reference numeral 10. The novel apparatus is known as a vacuum disk because it is not a conventional suction cup. The vacuum in a suction cup is small in magnitude and quickly dissipates. The vacuum in the novel vacuum disc, on the other hand, is a much greater vacuum and is not subject to quick dissipation. The novel vacuum disk will be known commercially as the VakuDisk.

Apparatus 10 includes hollow base 12, preferably having a disc shape although a shape of any predetermined geometrical configuration is within the scope of this invention. Apparatus 10 further includes sealing member 13 and a central hub 14 that is formed integrally with hollow base 12. Annular step 16 is formed in said central hub 14 about mid-height thereof and has a downward slope.

In this embodiment, sealing member 13 is provided in the form of a sealing ring but non-annular sealing members are within the scope of this invention.

Hub 14 defines an opening within which is received a valve member, the trailing end 18 of which is depicted in FIG. 1.

Cylindrical housing 20 includes flange 23 formed integrally therewith at its leading end. Flange 23 has a downward slope that matches the downward slope of annular step 16.

Housing 20 houses a plunger having a trailing end 22 that is depicted in FIG. 1.

Figure 2:
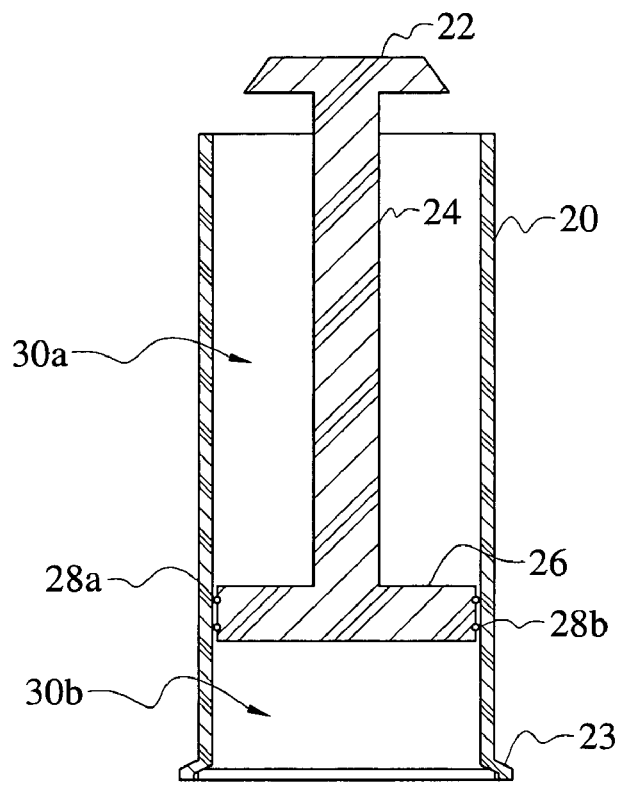
FIG. 2 is a sectional view taken along line 2—2 in FIG. 1.
Figure 2:
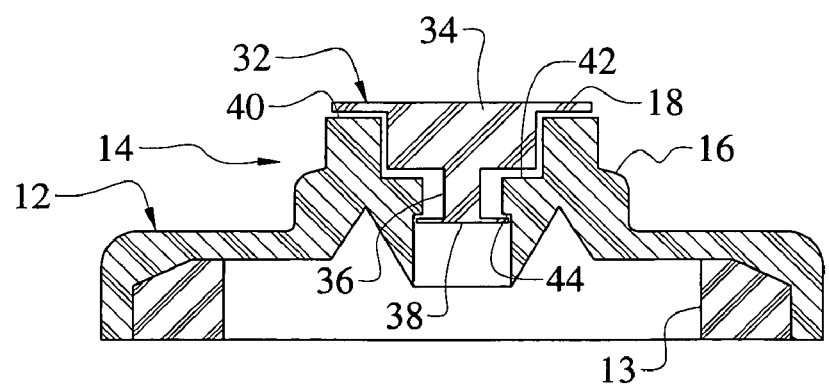
Figure 3:
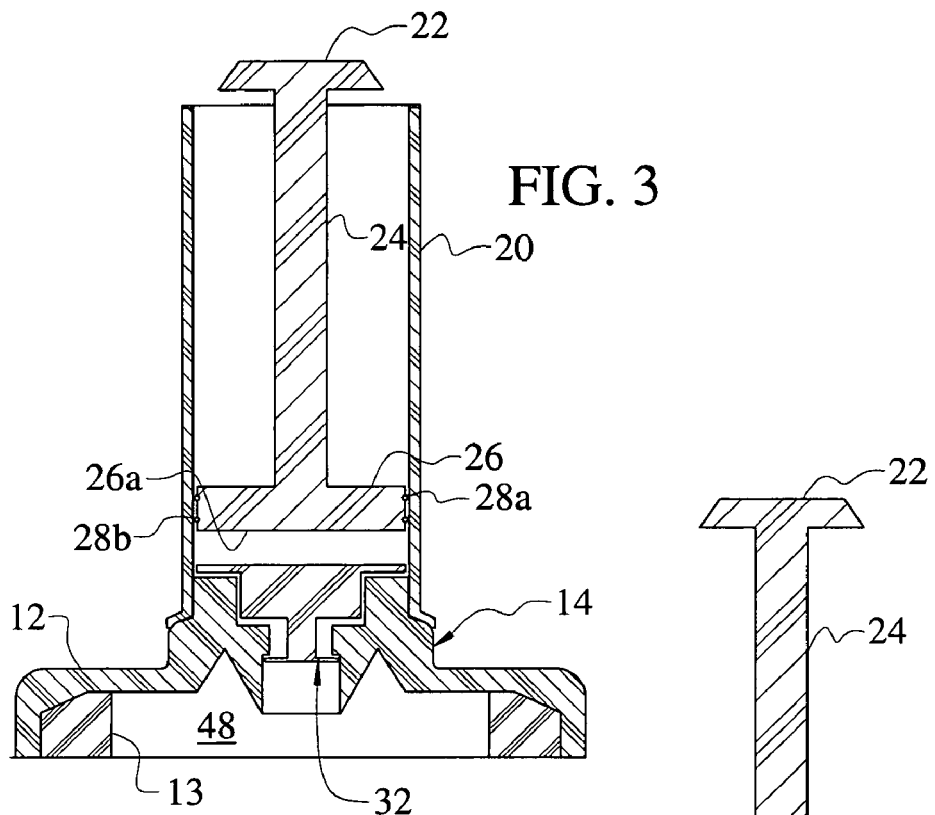
FIG. 3 is a sectional view of the first embodiment with the plunger almost fully advanced.

Referring now to FIG. 2, it will there be seen that trailing end 22 is a handle adapted to be manually grasped. Handle 22 is formed integrally with plunger rod 24 having a plunger head or piston 26 formed integrally therewith at a leading end thereof.

Annular grooves are formed in the periphery of piston head 26 to accommodate O-rings 28a, 28b. Said O-rings perform a sealing function that substantially seals air in trailing space 30a from air in leading space 30b when the novel structure is used in the way disclosed hereinafter.

Valve member 32 includes trailing end 18 as aforesaid. It further includes base 34 formed integrally with said trailing end 18, said base 34 having a diameter that is less than that of trailing end 18.

Valve member 32 further includes neck 36 that is formed integrally with base 34 and which has a reduced diameter with respect thereto. Retainer 38 of valve member 32 is formed integrally with neck 36 and has a diameter greater than that of neck 36. The diameter of retainer 38 is less than that of base 34 in this illustrative embodiment but such dimension is not believed to be critical.

Hub 14 includes flat top wall 40 of annular configuration. Flat top wall 40 supports trailing end 18 of valve 32 when valve 32 is in its position of repose as depicted in FIG. 2. Hub 14 further includes an integrally formed, radially inwardly extending first step 42 that similarly supports base 34 when valve 32 is in repose.

Hub 14 further includes undercut 44 that provides a stop means for leading end 38 of valve 32.

Figure 4:
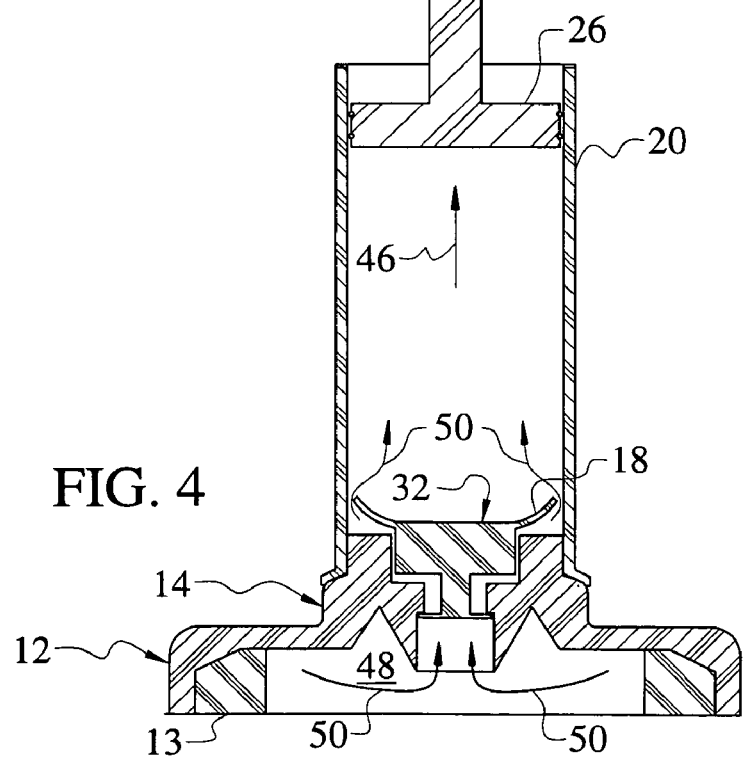
FIG. 4 is a sectional view of the first embodiment with the plunger almost fully retracted.
Figure 5:
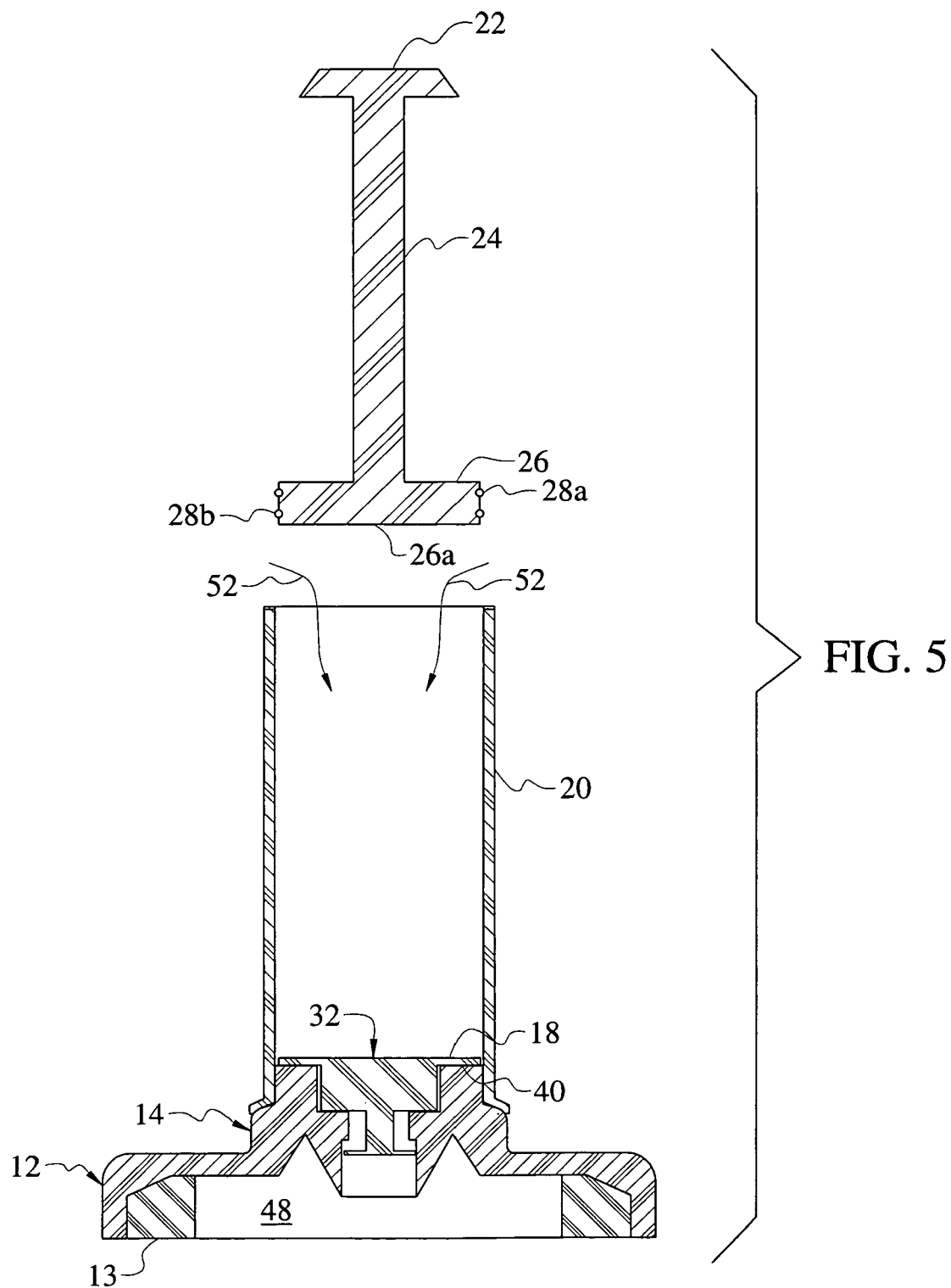
FIG. 5 is a sectional view of the first embodiment with the plunger fully retracted.

The operation of apparatus 10 is best understood in connection with FIGS. 4 and 5. FIG. 4 depicts piston head 26 in a position where it is almost fully advanced within cylindrical housing 20. When fully advanced, flat leading end 26a of piston head 26 bears against trailing end 18 of valve 32. This is the position the apparatus is placed into at the start of the vacuum-creating procedure.

After positioning apparatus 10 in the position depicted in FIG. 4, with sealing member 13 bearing firmly against a suitable support surface such as a wall, handle 22 is abruptly retracted from cylindrical housing 20 as indicated by single-headed directional arrow 46 in FIG. 5. Air in vacuum space 48 flows in the direction indicated by directional arrows 50 during the time said handle 22 is being retracted. Trailing end 18 of valve 32 is transiently bent as depicted in FIG. 5 so that air in said vacuum space 48 may flow therepast.

Figure 6:
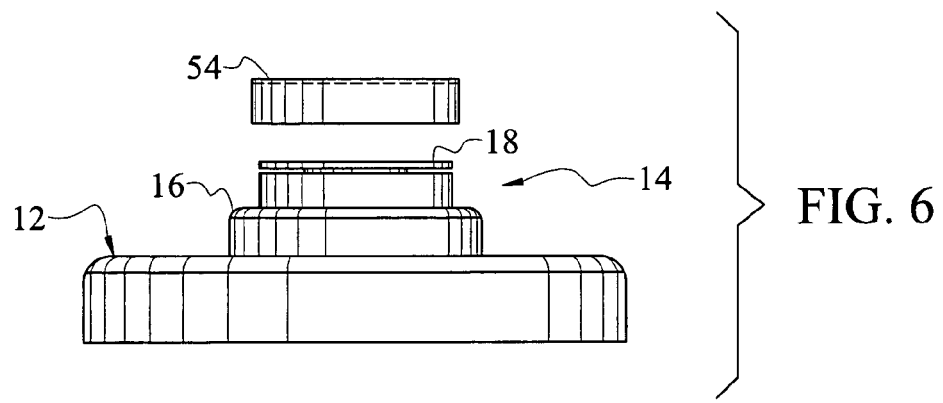
FIG. 6 is an exploded side elevational view of the base of the first embodiment.

When piston head 26 is fully retracted from cylindrical housing 20, ambient air then rushes into said cylindrical housing as indicated by arrows 52 in FIG. 6, forcing flat trailing end 18 into sealing relation to top wall 40 and sealing a vacuum in vacuum space 48.

Tests have shown that the vacuum thereby created can withstand an externally applied pulling force of nineteen (19) pounds, far in excess of all suction cups heretofore known. Moreover, the vacuum is sustained at high levels for a very long period of time, far longer than heretofore achieved.

Cap 54 in FIG. 6 is provided with novel apparatus 10 at the time of purchase and is used to seat trailing end 18 of valve 32 firmly against top wall 40 of hub 14 when apparatus 10 is in storage.

A second embodiment is depicted in FIGS. 7–12C. The same reference numerals are applied to parts that clearly correspond to parts in the first embodiment, even if the second embodiment of said parts is not exactly the same as the first embodiment.

Handle 22 of this embodiment is provided in the form of a rectangle so that it is easier to use than the flat handle of the first embodiment. A user may place one or two fingers through the loop formed by the rectangle so that plunger rod 24 may be quickly and easily pulled out of cylindrical housing 20.

Plunger rod 24 has a transverse cross-sectional shape of a plus (+) sign to save materials. Annular raised ridges 29a–29b are integrally formed with piston head 26, in lieu of the O-rings of the first embodiment, but said raised ridges perform the same sealing function as said O-rings.

Figure 7:
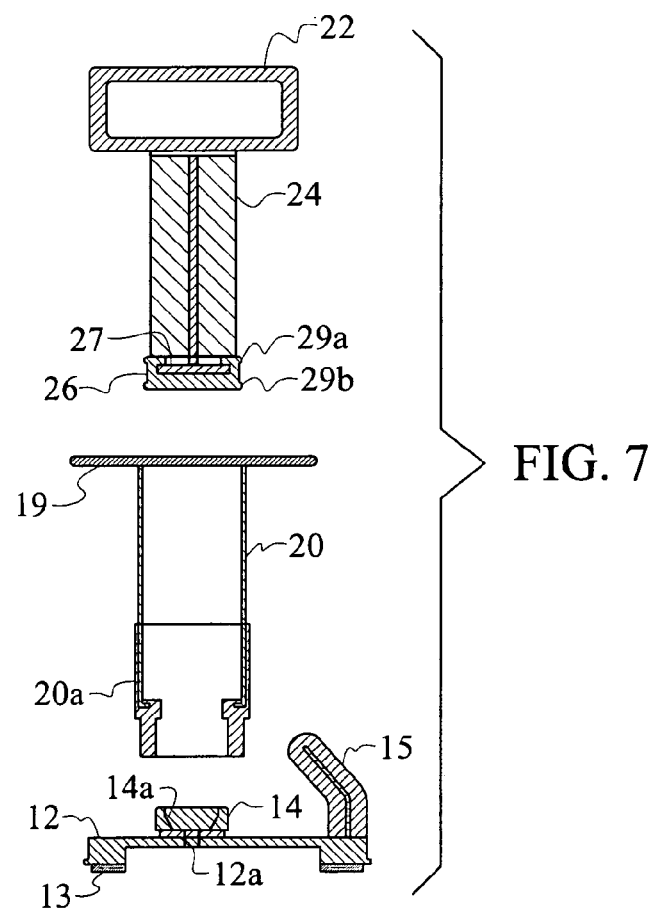
FIG. 7 is an exploded, side elevational, sectional view of a second embodiment.
Figure 8:
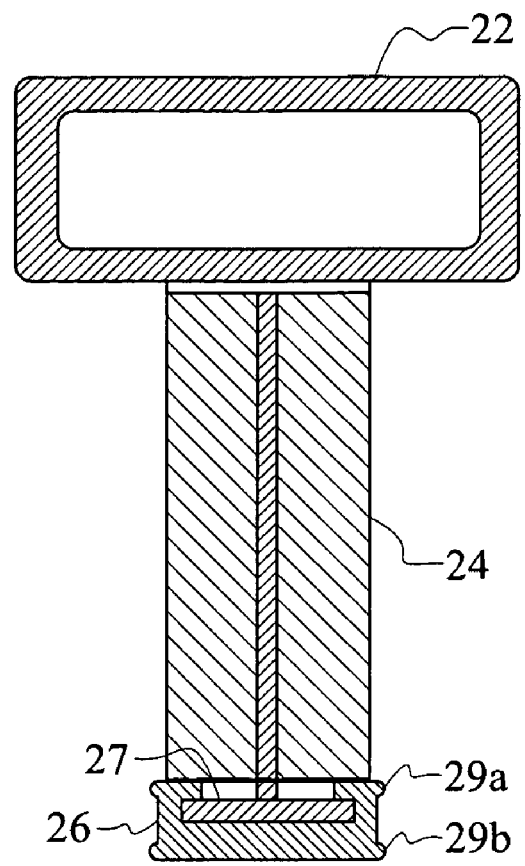
FIG. 8 is a side elevational. sectional view of the piston of the second embodiment.
Figure 9:
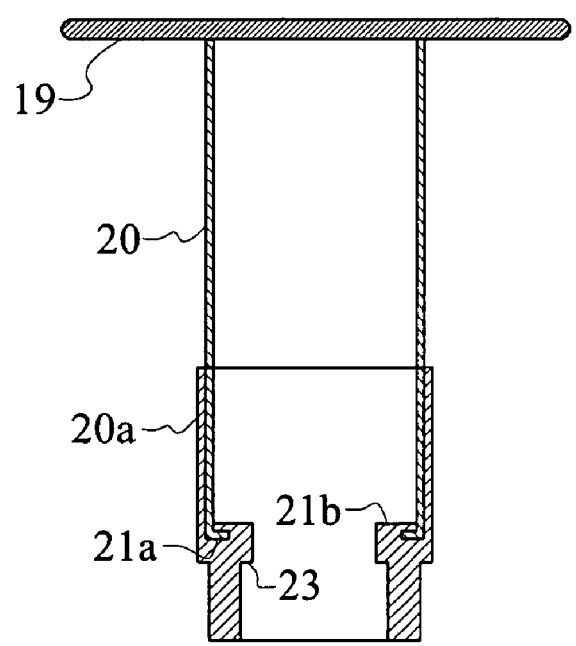
FIG. 9 is a side elevational, sectional view of the cylinder of the second embodiment.

FIG. 7 indicates that plunger rod 24 and plunger head 26 are separate parts. Plunger rod 24 is formed of a relatively stiff, high impact plastic but plunger head 26 and the piston rings formed integrally therewith are formed of a soft, flexible and resilient elastomer. Said plunger head 26 is engaged to mounting disc 27 that is secured to plunger rod 24. Accordingly, plunger head 26 does not separate from plunger rod 24 when handle 22 is pulled.

Cylindrical housing 20 includes flat flange 19 at its trailing end but said flange is provided for aesthetic purposes.

The leading end of cylindrical housing 20 is connected to a separate part 20a. As best understood in connection with FIG. 9, said separate part 20a slidingly receives the leading end of housing 20 and engages said leading end in the manner depicted. Specifically, housing 20 has a radially-inwardly turned lip 21a that is engaged by a radially outwardly turned catch 21b.

Significantly, cylindrical housing 20 is made of a relatively stiff, high impact plastic like piston rod 24, but separate part 20a is formed of a soft, flexible and resilient elastomer like piston head 26.

Elastomeric sealing member 13 is affixed to an underside of base 12. In this second embodiment, sealing member 13 has a generally square shape but other predetermined geometrical configurations are within the scope of this invention.

More particularly, a generally square channel having upstanding sidewalls is formed in the underside of base 12 and elastomeric sealing member 13 is press fit into said channel. Accordingly, no adhesive is required to secure sealing member to the underside of base 12. However, it is within the scope of this invention to secure sealing member 13 to the underside of base 12 by employing adhesives or other attachment means.

The thickness of sealing member 13 is greater than the height of the sidewalls of base 12 as indicated in the drawings. This provides ample compression space before said sidewalls abut the support surface to which the novel vacuum disk is attached.

Hub 14 surmounts base 12 and arm 15 extends therefrom as shown. Arm 15 may have a bend formed therein as depicted, or it may be hook-shaped, straight, or the like. An item to be supported by the novel vacuum disc is hung from said arm 15 in a well-known way.

Base 12 and hub 14 are both centrally apertured. The aperture formed in base 12 is denoted 12a and the aperture formed in hub 14 is denoted 14a.

Figure 11A:
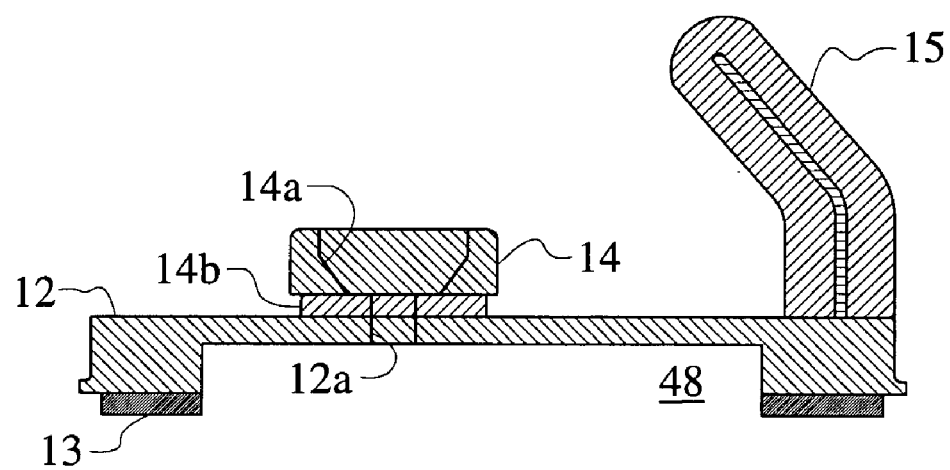
FIG. 11A is a side elevational, sectional view of the base of the second embodiment.
Figure 11B:
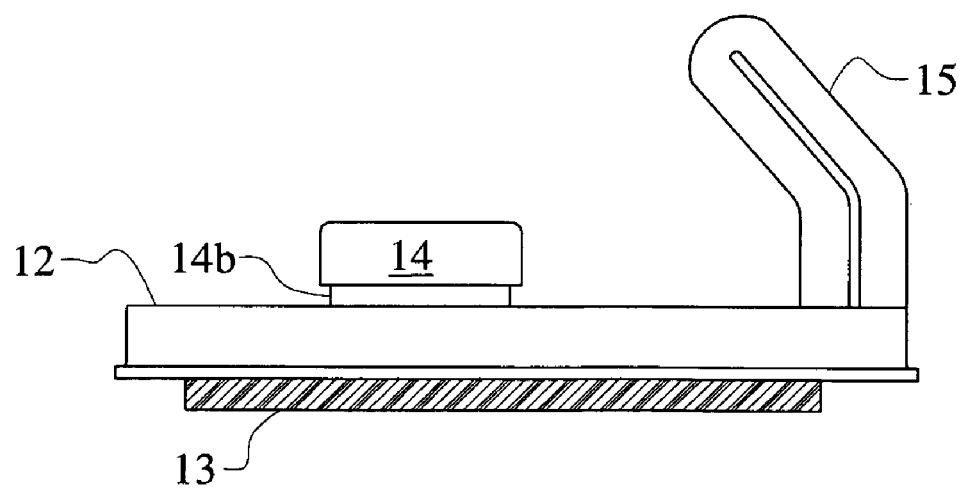
FIG. 11B is a side elevational view of the base of the second embodiment.
Figure 12A:
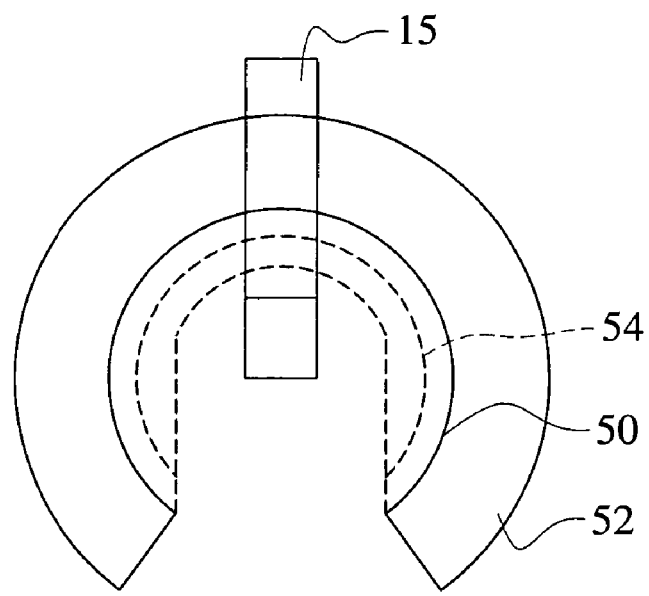
FIG. 12A is a top plan view of a base having a detachable handle.
Figure 12B:
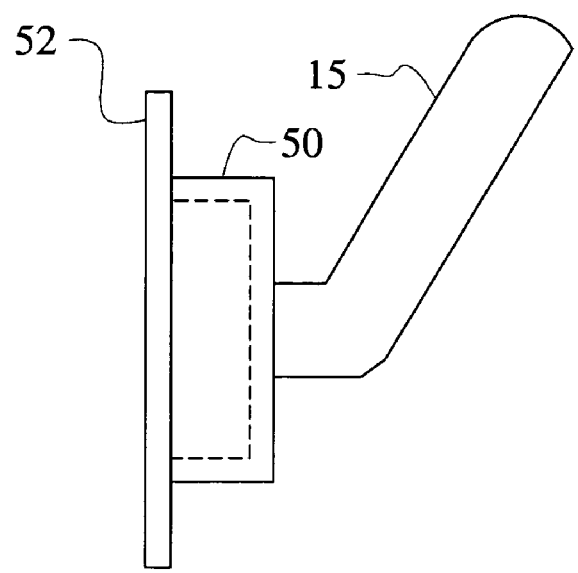
FIG. 12B is a side elevational view of the base depicted in FIG. 12A.
Figure 12C:
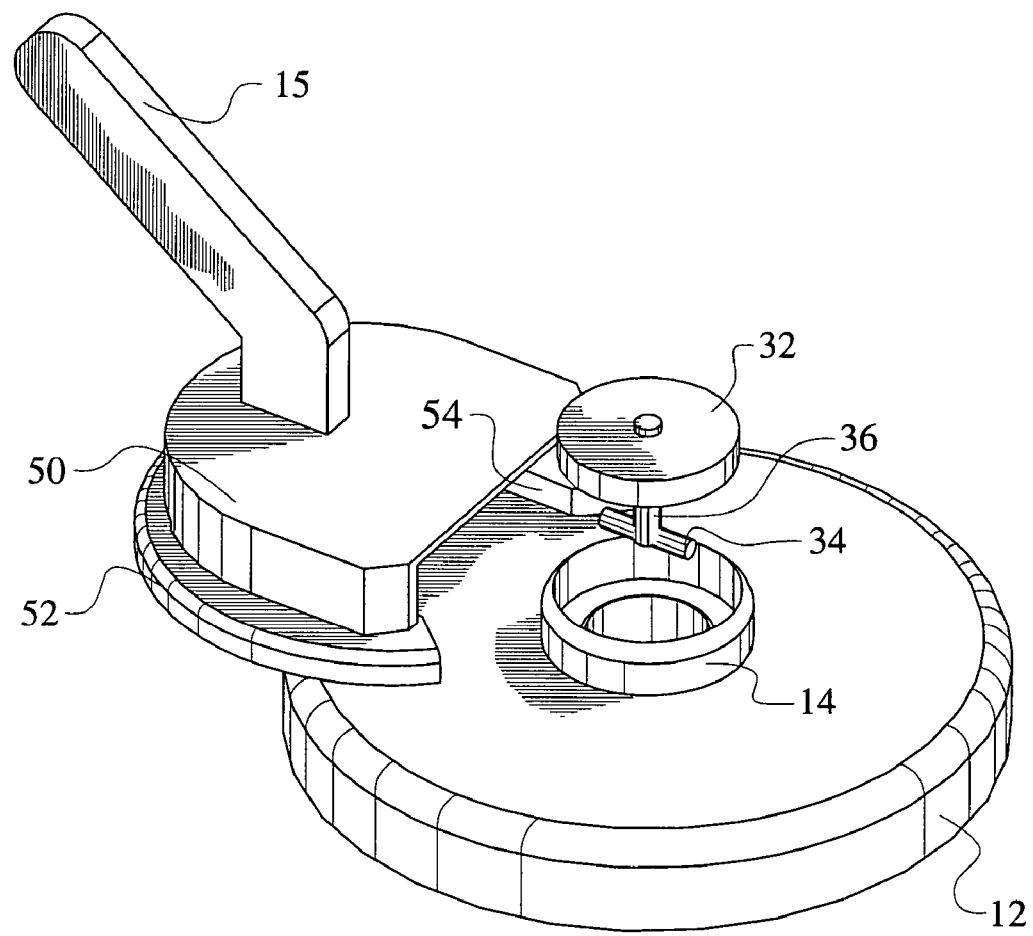
FIG. 12C is an exploded, perspective view of said base having said detachable handle.

As best understood in connection with FIGS. 11A and 12C, neck 36 of valve 32 extends through aperture 12a. Base 34 of said valve, which forms a "T" with said neck 36, is positioned below the plane of base 12 in space 48.

Figure 10:
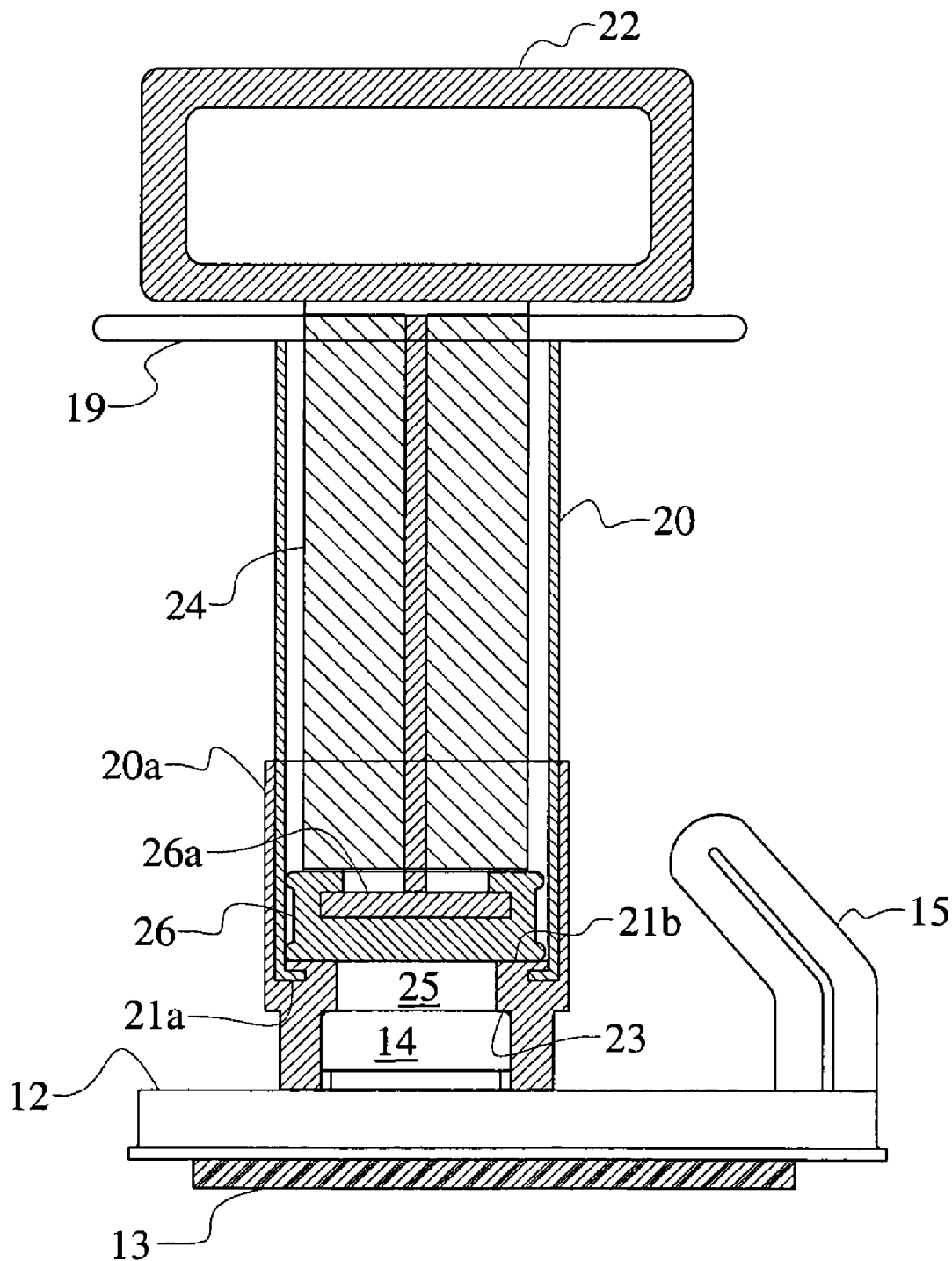
FIG. 10 is a side elevational, partially sectional view of the second embodiment in its assembled configuration.

A radially inwardly extending annular step 23 is formed in elastomeric part 20a and said step 23 abuts the top of hub 14 when the leading end of elastomeric part 20a abuts base 12 as depicted in FIG. 10. Empty space 25 is thus defined between piston head 26 and hub 14 when the leading end of elastomeric part 20a abuts base 12. Space 25 expands as piston head 26 is retracted from cylindrical housing 20, thereby creating a vacuum within the hollow interior of cylindrical housing 20. The air in sealed vacuum space 48 therefore momentarily lifts valve 32 so that air in vacuum space 48 may flow into expanding space 25. Base 34 of valve 32 limits the upward travel of valve 32 so that said valve 32 has a very short downward distance to travel when ambient air rushes into the hollow interior of cylindrical housing 20.

As in the first embodiment, with the leading end of elastomeric part 20a disposed in abutting relation to base 12 so that hub 14 is snugly received within said elastomeric part 20a as depicted in FIG. 10, withdrawal of plunger rod 24 from cylindrical housing 20 momentarily unseats valve 32 as air in vacuum space 48 is pulled into the hollow interior of cylindrical housing 20. Complete withdrawal of piston head 26 from cylindrical housing 20 allows ambient air to rush into said hollow interior, thereby quickly sealing valve 32 so that a strong vacuum is maintained in vacuum space 48.

A cap made of a soft, flexible and resilient material may then be placed over hub 14 for aesthetic purposes, i,e., to conceal valve 32.

An alternative embodiment is depicted in FIGS. 12A–12C. Instead of integrally forming arm 15 and base 12, arm 15 is integrally formed with a separate piece that slidingly engages hub 14. The separate piece is a hub cover 50 having external flange 52 and interior flange 54 that slidingly engages neck 14b of hub 14.

In all embodiments, sealing member 13 provides a good seal not only on perfectly flat surfaces but also on slightly uneven surfaces and on textured surfaces as well. Significantly, hollow cylinder 20 need not be positioned at a precise perpendicular relation to base 12. This is because the leading end 20a of said cylinder 20 is formed of a flexible and resilient material as aforesaid and therefore said cylinder may be tilted relative to its perpendicular position without substantially affecting its performance.

To obtain a good seal on even surfaces as well as on textured surfaces, the material from which the sealing member or gasket is made must have certain properties. In the manufacturing process, the material must go into a plastic state when heat-treated and must change into an elastic state after cooling down. Determining the ability of the material to seal on a rough surface is important, as is the modulus of the material. Materials of the same hardness may have a different stiffness because the quality of hardness indicates resistance to deformation or indenture and the quality of stiffness relates to the ability of a material to bend or stretch. A low compression set must be achieved to provide a long-term lifetime to the material and to enable its re-use. Any elastic material will lose its ability to return to its original thickness over time. The loss of resiliency may reduce, over time, the capability to perform of an elastomeric material in the form of a gasket, cushioning pad, sealing member, or the like. The resulting permanent set that a sealing member may attain may cause a leak.

Accordingly, the sealing material is preferably based on styrene-block-copolymers that are generally available as styrene-ethylenebutylene-styrene. Additional components include oils, secondary polymers such as polypropylene, and additives that achieve specific goals. There is a wide choice of components. Moreover, the proportions may be changed but it is important to attain the required degree of hardness to ensure that the sealing member or gasket will seal tightly on flat, uneven, and textured surfaces. Those skilled in the chemical arts can therefore tailor the compounds to reach specific targets, and change certain properties while retaining other properties.

The microstructure includes block-copolymers/oil phase in an interpenetrating network with a secondary copolymer. A fine interpenetration network is important and is achieved by choosing a secondary copolymer which has good miscibility with the block-copolymer, and with similar viscosity to the block-copolymer/oil mixture. When a good interpenetration network is achieved, then the properties of the secondary polymer and the block-copolymer/oil phase are synergistically enhanced.

The desired properties of the sealing member include weathering resistance and ability to reach a low hardness. The sealing member should have high resistance against acids, bases, and alcohols. It should exhibit high ozone and UV-resistance. The durometer reading on the Shore hardness A scale should be between 5 and 60.

The novel seal conforms to uneven surfaces very well as aforesaid. It was tested by NASA using helium instead of atmospheric air and found to have no leaks.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described.

What is claimed is:

1. A vacuum disk apparatus adapted to engage a support surface, comprising:
   a hollow base having a shape of predetermined geometrical configuration;
   said hollow base including a top wall having sidewalls that depend from a periphery of said top wall;
   a sealing member that abuts a bottom side of said top wall;
   said sealing member being formed of a flexible and resilient material;
   said sealing member having a thickness greater than a length of said sidewalls;
   a vacuum space defined by said top wall, said sealing member, and said support surface when said sealing member is disposed in abutting relation to said support surface;
   said sealing member adapted to substantially seal said vacuum space when said sealing member is pressed firmly against said support surface so that ambient air may not substantially enter into said vacuum space;
   a hub formed integrally with said top wall of said base;
   a hub airflow passageway formed in said hub;
   a base airflow passageway formed in said top wall of said base;
   said hub airflow passageway and said base airflow passageway being in fluid communication with one another;
   a valve including a flexible valve body, a neck, and a retainer;
   a hollow cylinder having a leading end adapted to abut said top wall of said base and to sealingly engage said hub about an outer periphery of said hub;
   a piston head slideably positioned within said hollow cylinder;
   a piston rod secured to a trailing end of said piston head, said piston rod having an axis of symmetry coincident with an axis of symmetry of said hollow cylinder;
   a handle secured to a trailing end of said piston rod;
   sealing means disposed about a periphery of said piston head to substantially prevent air from flowing around said piston head;
   said valve allowing airflow from said vacuum space to flow through said base airflow passageway and said hub airflow passageway into said hollow cylinder on a leading side of said piston head when said piston head is displaced within said hollow cylinder in a direction away from said valve;
   said valve being fully seated and substantially preventing flow of ambient air into said vacuum space from said hollow cylinder after said piston head is fully withdrawn from said hollow cylinder;
   whereby a vacuum is created in said vacuum space by withdrawal of said piston head from said hollow interior of said cylinder; and
   whereby ambient air rushing into the hollow interior of said cylinder abruptly closes said valve before said vacuum is lost.

2. The vacuum disk apparatus of claim 1, further comprising:
   said hollow cylinder made of a relatively stiff material;
   said leading end of said hollow cylinder made of a soft, flexible and resilient material so that said leading end need not abut said base in perpendicular relation thereto.

3. The vacuum disk of claim 1, further comprising:
   an arm secured to said base;
   whereby an item may be suspended from said arm when said base is secured to said support surface.

4. The vacuum disk of claim 1, further comprising:
   a hub cover releasably mounted to said hub; and
   an arm secured to said hub cover;
   whereby an item may be suspended from said arm when said base is secured to said support surface and said hub cover is secured to said hub.

5. The vacuum disk of claim 1, further comprising:
   said piston rod made of a relatively stiff material;
   said piston head made of a soft, flexible and resilient material.

6. The vacuum disk of claim 5, further comprising:
   at least one piston ring formed integrally with said piston head;
   said at least one piston ring formed of said soft, flexible and resilient material.

7. The vacuum disk of claim 1, further comprising:
   a channel formed in said bottom side of said top wall of said base;
   said sealing member being press fit into said channel.

8. The vacuum disk of claim 7, further comprising:
   an adhesive for securing said sealing member within said channel.

9. The vacuum disk of claim 1, further comprising:
   said sealing member being formed of a preselected styrene-block-copolymer.

10. The vacuum disk of claim 9, further comprising:
    said styrene block copolymer being styrene-ethylenebutylene-styrene.

* * * * *